Sept. 13, 1966   P. V. VERMONT ETAL   3,272,289
ROTARY DAMPING DEVICE USING LAPPED FRUSTO-CONICAL SURFACES
Filed Nov. 5, 1964

Paul V. Vermont
Paul J. Cueni,
INVENTORS.

3,272,289
ROTARY DAMPING DEVICE USING LAPPED
FRUSTO-CONICAL SURFACES
Paul V. Vermont, Santa Monica, and Paul J. Cueni, Los Angeles, Calif., assignors, by mesne assignments, to the United States of America as represented by the Secretary of the Army
Filed Nov. 5, 1964, Ser. No. 409,337
1 Claim. (Cl. 188—90)

This invention relates to a rotary damping device that includes lapped mating frusto-conical working surfaces with viscous lubricating means therebetween and means to hold the two frusto-conical surfaces together for rotation relative to each other.

Rotary damping devices of this type in use today include cylindrical, frusto-conical or disk-shaped working surfaces with either fixed or adjustable working gap thicknesses that are based on the use of machined surfaces and well defined gap thicknesses. These rotary damping devices exclude the use of very small gap thickness due to machining and assembly accuracies.

In view of the above enumerated limitations of the prior art devices, this invention is provided to satisfy a need for a rotary damping device that can be made smaller than prior art devices and with a smaller gap thickness between the confronting frusto-conical surfaces of the device.

Therefore, it is an object of this invention to provide a rotary damping device that has lapped mating frusto-conical surfaces.

Another object of this invention is to provide a rotary damping device that is very accurately made thereby allowing the damping device to be made lighter as well as smaller.

In accordance with this invention, a new and improved rotary damping device is provided, that includes a stator member and a rotor member, both of which have a lapped mating surface to provide a rotary connection. A viscous lubricating fluid is placed between the lapped surface of the stator and rotor, and a fastening means maintains the stator and rotor in assembled rotary relationship.

Figure 1:
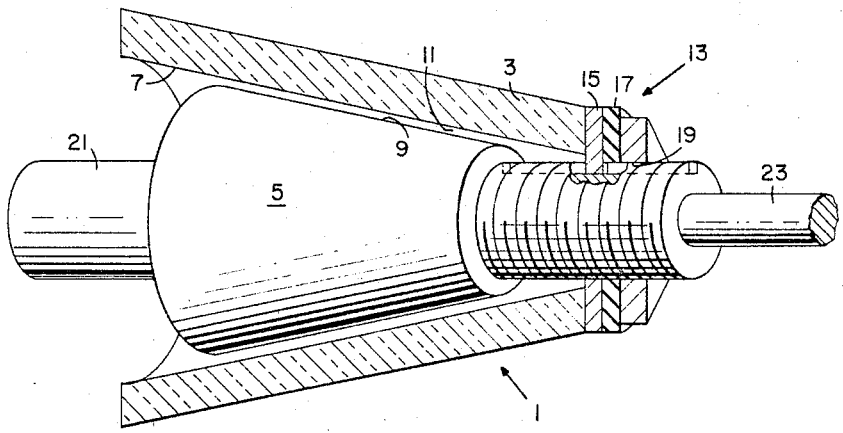
Figure 2:
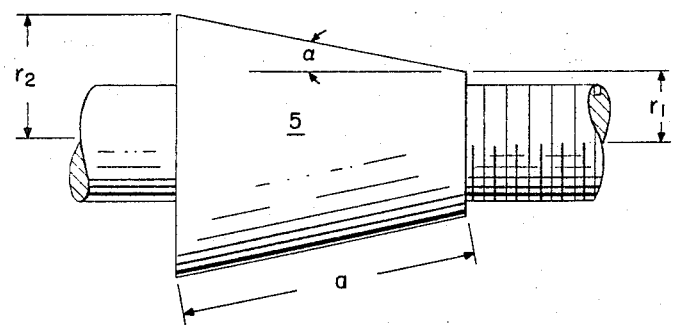

In the accompanying drawing forming a part of this specification, and in which like numerals are employed to designate corresponding parts throughout the same:

FIGURE 1 is a sectional view of a rotary damping device according to this invention, and FIGURE 2 is a perspective view of a rotor member of the rotary damping device.

This invention may be better understood by referring to FIGURE 1 of the drawing wherein, numeral 1 designates, for example, a rotary damping device that includes a stator member 3 and a rotor member 5. Stator member 3 has a frusto-conical surface 7 that mates with frusto-conical surface 9 of rotor member 5. Surfaces 7 and 9 are mated together by placing grinding compound therebetween and lapping the two surfaces together or by other conventional lapping methods. After the two surfaces have been lapped together and cleaned, a minimum gap 11 (exaggerated as shown) is defined between the two confronting lapped surfaces. A lubricating fluid, for example 100,000 centistokes viscosity, is placed in gap 11 and fastening means 13, that includes key washer 15, rubber washer 17 and bolt means 19, holds stator member 3 and rotor member 5 together in a rotary assembled relationship. Stem 21 or 23 may be used to rotate rotor member 5 relative to stator member 3. Stator member 3 and rotor member 5 may be made from materials such as glass, stainless steel, ceramics and other similar materials.

Rotor member 5, as shown in FIGURE 2, with the below enumerated dimensions has been found to work acceptably. Rotor member 5 has a working surface $a$ 1.5 inches long, a major diameter $r_2$ of ¾ inch, a minor diameter $r_1$ of 9/16 inch and a half-cone aperture angle $\alpha$ of 3.58°.

When the rotary damping device is assembled, rotary motion of rotor member 5 relative to stator member 3 has a nice smooth feel in response to manual manipulation down to the lowest rates of rotation and without any apparent stickiness. Even if the rotor member and stator member are intentionally pressed together, the damping characteristics of the rotary damping device are seemingly unaffected. A plot of driving torque versus angular rate shows a well-pronounced viscous damping characteristic. The damping coefficient falls off slightly at the high end of angular rates. The highest tested angular rate, $W=.5$ rad/sec., requires a driving torque $T=4.0$ in.-lb., which corresponds to a damping coefficient $D=8$ in.-lb.-sec./rad. Here, $D$=damping coefficient, in.-lb.-sec./rad.
$T$=driving torque, in.-lb.
$W$=angular rate, rad/sec.

$$D=T/W$$

Computations show that with the above described dimensions and viscosity, the specified damping rate indicates an effective uniform gap of .000586 inch. This is about 10 to 20 times smaller than the smallest gap dimensions used or proposed for machined type surfaces.

In connection with the very thin fluid layer in working gap 11, some apprehension appeared in regard to a possible heating effect due to the mechanical viscous braking action. Depending upon the particular use of the device, if the rotary connecting device heats too much, it can be provided with heat dissipating means such as fins to prevent over heating.

It is to be understood that the form of our invention, herewith shown and described, is to be taken as a preferred example only, and that various changes in the size, shape and arrangement of parts may be resorted to, without departing from the spirit of our invention or the scope of the subjoined claim.

We claim:

A rotary damping device including: inner and outer elongated members made of glass and having lapped frusto-conical mating surfaces; said frusto-conical surfaces defining therebetween an effective gap of approximately .0006 inch; viscous lubricating means filling said gap; and inner member having a half-cone aperture angle of approximately 3.58°; and means securing said inner and outer members together for rotary movement relative to each other.

References Cited by the Examiner

UNITED STATES PATENTS

| | | | |
|---|---|---|---|
| 2,080,279 | 5/1937 | Kellogg | 188—90 |
| 2,779,442 | 1/1957 | Bacon | 188—90 |
| 2,859,624 | 11/1958 | Carter | 188—90 |

MILTON BUCHLER, *Primary Examiner.*

G. E. A. HALVOSA, *Assistant Examiner.*